United States Patent [19]

Kobayashi et al.

[11] Patent Number: 5,234,508
[45] Date of Patent: Aug. 10, 1993

[54] SOLDERING PASTE FOR LIGHT BEAM-HEATING SOLDERING

[75] Inventors: Makoto Kobayashi, Kawanishi; Syoichi Mizuuchi, Nishinomiya; Reiko Watanabe, Toyonaka; Toshio Matsumoto, Yao; Naoki Muraoka, Nishinomiya; Tosiyuki Masuda, Kashihara, all of Japan

[73] Assignees: Matsushita Electric Industrial Co. Ltd.; Ishikawa Metal Co., Ltd., both of Osaka, Japan

[21] Appl. No.: 833,717

[22] Filed: Feb. 11, 1992

[30] Foreign Application Priority Data

Feb. 12, 1991 [JP] Japan .................. 3-041137

[51] Int. Cl.⁵ ........................... B23K 35/34
[52] U.S. Cl. ........................ 148/24; 148/23; 148/25
[58] Field of Search .................... 148/23-25

[56] References Cited

U.S. PATENT DOCUMENTS

| | | | |
|---|---|---|---|
| 3,684,533 | 8/1972 | Conwicke | 148/24 |
| 4,568,395 | 2/1986 | Nabhani | 148/23 |
| 4,759,490 | 7/1988 | Ochiai | 148/24 |

*Primary Examiner*—Peter D. Rosenberg
*Attorney, Agent, or Firm*—Wenderoth, Lind & Ponack

[57] ABSTRACT

A soldering paste for light beam-heating soldering containing a flux which contains 2 to 8 % by weight of a thixotropic agent having a melting point of 140° to 150° C., 1.8 to 3.0 % by weight of an activator containing cyclohexylamine hydrobromide, 40 to 50 % by weight of a rosin component and 40 to 50 % by weight of a solvent; and spherical solder particles having a particle size of 250 to 400 mesh and an oxygen content of not larger than 200 ppm, in which a content of the flux in the soldering paste is from 9 to 13 % by weight and the soldering paste has a thixotropy index of 7 to 8.

3 Claims, 2 Drawing Sheets

SOLDER BALLS

SOLDERING PASTE FOR LIGHT BEAM-HEATING SOLDERING

BACKGROUND OF THE INVENTION

1. Field of the Invention

The present invention relates to a soldering paste for light beam-heating soldering. In particular, the present invention relates to a soldering paste for light beam-heating soldering, which is used in soldering a surface-mounting type electronic part such as QFP, SOP and the like on a printed board.

2. Description of the Related Art

In the light beam-heating soldering, a soldering paste which contains 14 to 15% by weight of a flux and has a melting point of about 100° C. and a thixotropy index of about 5 is conventionally used.

When the conventional soldering paste is used in the light beam-heating soldering, a temperature of a heated part of the soldering paste very quickly rises so that the soldering paste is slumped and flows from a land, which leads to formation of solder balls and causes troubles such as short-circuiting in a circuit.

SUMMARY OF THE INVENTION

An object of the present invention is to provide a soldering paste which can prevent formation of the solder balls and, in turn, short-circuiting in the circuit in the light beam-heating soldering.

According to the present invention, there is provided a soldering paste for light beam-heating soldering comprising:

a flux which comprises 2 to 8% by weight of a thixotropic agent having a melting point of 140° to 150° C., 1.8 to 3.0% by weight of an activator containing cyclohexylamine hydrobromide, 40 to 50% by weight of a rosin component and 40 to 50% by weight of a solvent; and spherical solder particles having a particle size of 250 to 400 mesh and an oxygen content of not larger than 200 ppm, wherein a content of said flux in the soldering paste is from 9 to 13% by weight and the soldering paste has a thixotropy index of 7 to 8.

DETAILED DESCRIPTION OF THE INVENTION

Figure 1:
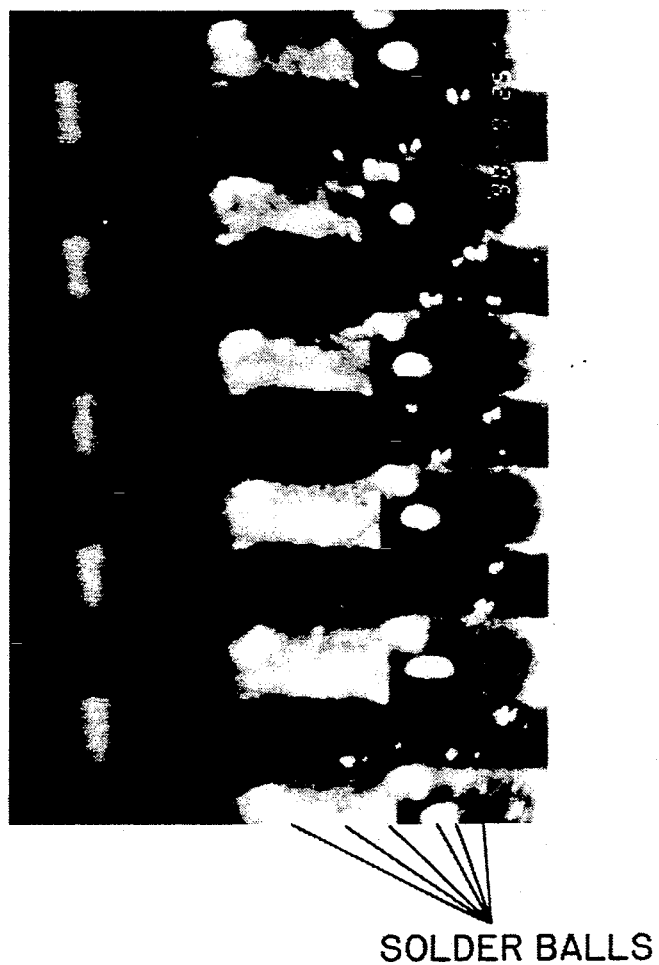
FIGS. 1 and 2 are photographs of the soldered parts of QFP using the conventional soldering paste and the soldering paste of the present invention, respectively.

In the present invention, the "spherical" solder particle means that the solder particles have an aspect ratio of 1.1 or less.

A thixotropy index is a ratio of a viscosity at 1 rpm to that at 10 rpm when measured with a Brookfield type viscometer (B-type viscometer).

With the soldering paste of the present invention, the formation of the solder balls may be prevented by the combination of the following mechanism:

1. Prevention of slump

In the present invention, the soldering paste contains a high melting point thixotropic agent having a melting point of 140° to 150° C., whereby a melting point of the soldering paste is made higher than that of the conventional one. Since the conventional soldering paste contains a thixotropic agent having a melting point of about 100° C., it suffers from slumping in the light beam-heating. In the present invention, since the thixotropic agent has a melting point of 140° to 150° C., the slump of the paste is prevented.

The content of the flux in the conventional soldering paste for dispensing is from 14 to 15% by weight in view of good discharge. At such high content of the flux, the slump of the soldering paste is enhanced by heating. Since the soldering paste of the present invention has the thixotropy index of 7 to 8, it has good thixotropy. In addition, since the spherical solder particles having a particle size of 250 to 400 mesh are used, the dischageability from a syringe is not deteriorated when the content of the flux is decreased to 9 to 13% by weight and the slump is prevented.

2. Decrease of the oxygen content of the solder particles

When the surfaces of the solder particles are covered with an oxide film, the number of the solder balls increases.

Since the soldering paste of the present invention contains the solder particles having the oxygen content of 200 ppm or less, preferably 150 ppm or less, the formation of the solder balls is minimized. Such solder particles having the small oxygen content can be produced by forming the solder particles under reduced pressure of, for example, 10 Torr or less, or in an inert gas such as nitrogen, helium, argon, etc.

3. Unification of the solder particle size

According to results of various experiments, it has been found that the particle size in the range between 250 mesh and 400 mesh is found to be best. Outside this range, the number of the solder balls increases.

4. Improvement of wettability

When the solder particles have poor wettability, the increase of the number of the solder balls is observed. In the present invention, 1.8 to 3.0% by weight of the activator containing cyclohexylamine hydrobromide is added to the flux, whereby a wetting rate is increased to suppress the formation of the solder balls.

Examples of the thixotropic agent used in the present invention are methylenebisstearic amide, ethylenebisstearic amide, ethylenebis-12-hydroxystearic amide, ethylenebisbehenic amide, butylenebisstearic amide, hexamethylenebisstearic amide, hexamethylenebisbehenic amide, distearyladipic amide, distearylcebacic amide, and the like.

The activator should contain cyclohexylamine hydrobromide. Examples of other ingredients in the activator are diethylamine hydrobromide, triisopropanolamine hydrobromide, dimethylamine hydrochloride, and an organic acid (e.g. adipic acid, glutaric acid, pimeric acid, suberic acid, etc.).

Examples of the rosin are polymerized rosin, disproportionated rosin, hydrogenated rosin, and the like.

Examples of the solvent are hexylene glycol, terpineol, hexylene glycol, diethylene glycol monomethyl ether, diethylene glycol monoethyl ether, methyl benzoate, ethyl benzoate, 1,3-butanediol, diethyl adipate, diisopropyl adipate, and the like.

The soldering paste of the present invention may further contain at least one of conventional additives for the soldering paste, such as an antioxidant (e.g. butylhydroxytoluene, butylhydroxyanisol, etc.), a foam inhibitor (e.g. ethyleneoxide-added acetylene glycol (acetylenol), silicone oils, etc.) and the like.

As a solder, any of the conventional ones can be used. Specific examples are Sn(63%)/Pb(37%), Sn(62%)/Pb(36%)/Ag(2%), Sn(43%)/Pb(43%)/Bi(14%), Sn(42%)/Bi(58%), Sn(5%)/Pb(97.5%)/Ag(2.5%), and Sn(96.5%)/Ag(3.5%).

PREFERRED EMBODIMENTS OF THE INVENTION

The present invention will be illustrated by following Example.

EXAMPLE

A soldering paste was prepared by mixing and dispersing the following components:

| Flux components | |
|---|---|
| 45% by weight of | a rosin component (polymerized rosin and disproportionated rosin in a weight ratio of 2:1) |
| 46% by weight of | a mixed solvent (hexylene glycol and terpineol in a weight ratio of 10:13) |
| 6% by weight of | a thixotropic agent (ethylenebis-12-hydroxystearic amide and castor was in a weight ratio of 2:1) |
| 2% by weight of | an activator (cyclohexylamine hydrobromide and adipic acid in a weight ratio of 1:1) |
| 0.5% by weight of | an antioxidant (butylhydroxytoluene) |
| 0.5% by weight of | a foam inhibitor (acetylenol) |

Solder particles

Spherical particles of Sn(63%)/Pb(37%) of 250–400 mesh having an oxygen content of 150 ppm.

A weight ratio of the flux to the solder particles was 12:88.

Figure 2:

Using the above soldering paste, QFP having 0.65 mm or 0.5 mm pitch was soldered. No solder ball was found. The photograph of the soldered QFP is shown in FIG. 2.

Comparative Example

Using a conventional soldering paste having the following composition, QFP was soldered:

Flux components -

50% by weight of polymerized rosin
45% by weight of hexylene glycol
3% by weight of castor wax
1% by weight of diethylamine hydrobromide
0.5% by weight of butylhydroxytoluene
0.5% by weight of silicone oil

Solder particles

Spherical particles of Sn(63%)/Pb(37%) of 250–400 mesh having an oxygen content of 150 ppm.

A weight ratio of the flux to the solder particles was 14:86.

Solder balls were found as seen from the photograph of FIG. 1.

What is claimed is:

1. A soldering paste for light beam-heating soldering consisting essentially of:
   flux which comprises 2 to 8% by weight of a thixotropic agent having a melting point of 140° to 150° C., 1.8 to 3.0% by weight of an activator containing cyclohexylamine hydrobromide, 40 to 50% by weight of a rosin component and 40 to 50% by weight of a solvent; and
   spherical solder particles having a particle size of 250 to 400 mesh and an oxygen content of not larger than 200 ppm,
   wherein a content of said flux in the soldering paste is from 9 to 13% by weight and the soldering paste has a thixotropy index of 7 to 8.

2. The soldering paste according to claim 1, wherein said oxygen content of said solder particles is not larger than 150 ppm.

3. The soldering paste according to claim 1 wherein the thixotropic agent is selected from the group consisting of methylenebisstearic amide, ethylenebisstearic amide, ethylenebis-12-hydroxystearic amide, ethylenebisbehenic amide, butylenebisstearic amide, hexamethylenebisstearic amide, hexamethylenebisbehenic amide, distearyladipic amide and distearylcebacic amide.

* * * * *